United States Patent Office 3,311,673
Patented Mar. 28, 1967

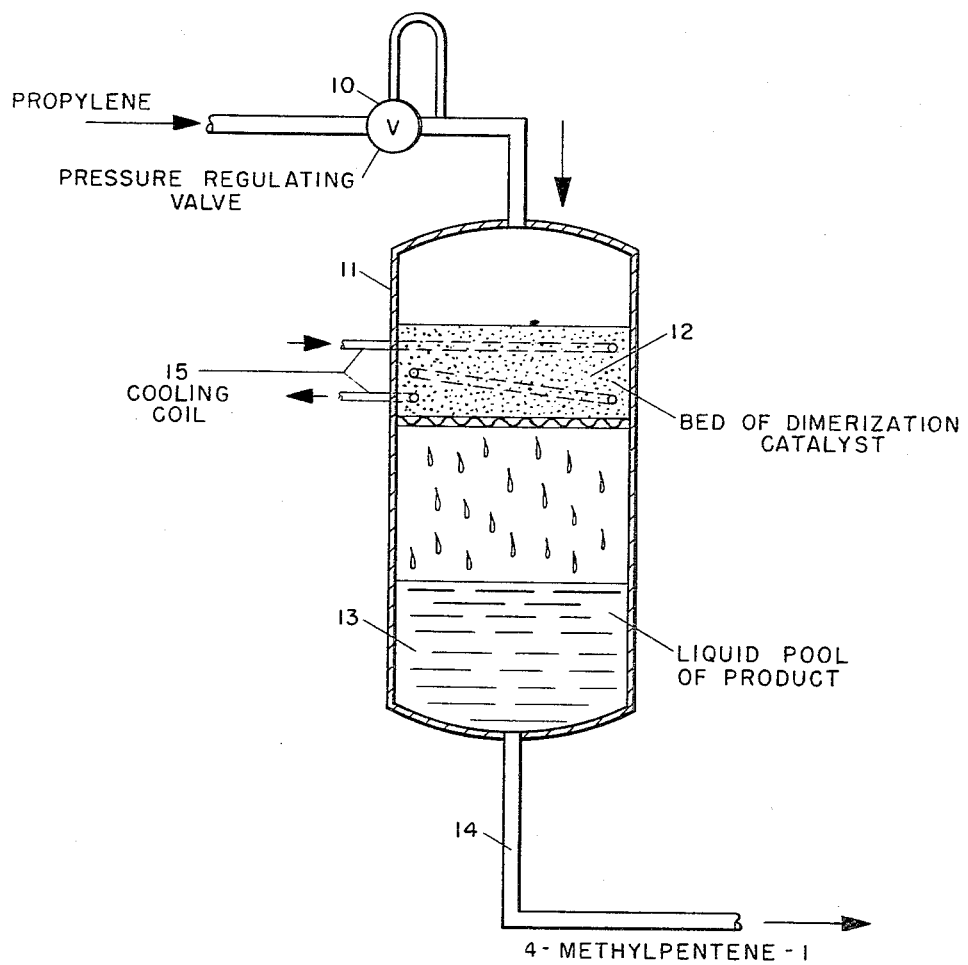

3,311,673
PREPARATION OF 4-METHYLPENTENE-1
Lewis W. Hall, Jr., Claymont, Del., and Wilmer E. McCorquodale, Jr., Delaware County, Pa., assignors to Sun Oil Company, Philadelphia, Pa., a corporation of New Jersey
Filed Nov. 1, 1965, Ser. No. 505,947
9 Claims. (Cl. 260—683.15)

This application is a continuation-in-part of our co-pending application Ser. No. 266,671, filed Mar. 20, 1963.

This invention relates to the preparation of 4-methylpentene-1 by the dimerization of propylene under certain catalytic reaction conditions adapted to suppress isomerization of the dimerization product.

The catalytic polymerization of propylene ordinarily results in a mixture of polymerization products which vary considerably in molecular weight and which may range from liquid to solid polymers. Recently certain types of catalysts have been developed which have the unique property of dimerizing propylene forming hexenes as the major product. These dimerization products, which are practically all methylpentenes, are useful as high octane components of motor fuels. Certain of the methylpentenes, particularly 4-methylpentene-1, are useful as monomers in the production of polyolefin resins.

It has generally been disclosed in the prior art that alkali metal catalysts including potassium, rubidium, and cesium are suitable for dimerizing propylene to produce methylpentenes. These prior art catalysts may be in the form of a liquid metal as a film on an inert support or as a solid metal catalyst. Other catalysts capable of dimerizing propylene include various alkali metal alkyls and hydrides.

In the dimerization of propylene the primary reaction is one in which 4-methylpentene-1 is formed according to the following equation in which only the carbon skeletal arrangement of the hydrocarbons is shown:

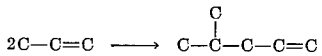

The catalysts known for promoting this reaction generally will also cause isomerization reactions to occur in addition to the primary dimerization. This isomerizing ability of the catalysts causes the 4-methylpentene-1 to undergo isomerization resulting also in the formation of 4-methylpentene-2, 2-methylpentene-1, and 2-methylpentene-2. This is disadvantageous in cases where 4-methylpentene-1 is the only isomer desired such as when it is to be used as a monomer for making solid polymers. The isomerization effect not only reduces the yield of the desired isomer but also produces a mixture of isomers that are extremely difficult to separate from each other so that 4-methylpentene-1 of high purity cannot readily be obtained from the mixture.

The present invention is directed to a method of dimerizing propylene in such a manner that isomerization is minimized and the formation of 4-methylpentene-1 is maximized.

According to the invention propylene is dimerized to form 4-methylpentene-1 by contacting it with any conventional or suitable propylene dimerization catalyst in solid granular form. The reaction is carried out under temperature and pressure conditions at which the propylene is in vapor form but the desired dimer product is liquid. Isomerization of the 4-methylpentene-1 to other isomeric forms of methylpentene is minimized by operating in a manner such that the 4-methylpentene-1 is removed from contact with the catalyst shortly after it is formed. Furthermore, this is done without passing any substantial amount of propylene from the reactor before it has had time to dimerize. Thus the recovery and recycling of unreacted propylene is obviated.

As stated above any propylene dimerization catalyst which can be used in the form of a granular solid can be employed in the present process even though it may have substantial activity for promoting isomerization reactions. The catalyst can be in the form of spheres, pellets, granules or other particles. The catalyst generally can have a mesh size in the range of 2–50 (U.S. sieve series). This catalyst can be a free metal on an active or inactive support or a metal complex which may be on an active or inactive support. Examples of suitable catalysts include potassium contained on a support such as potassium chloride, sodium chloride, carbon, silica, etc.; sodium alkyls contained on a support such as sodium chloride or any support which is chemically inert to the alkyl; sodium aryls contained on a support such as sodium chloride or any material which is inert to the aryl portion of molecule. These catalysts can be prepared by conventional methods. For example, in the preparation of potassium on a support, the inert supporting material is heated to a temperature greater than the melting point of the potassium, the molten potassium is added to and mixed thoroughly with the granular support and the mixture subsequently is allowed to cool. These sodium alkyls and aryls contained on a support are conveniently prepared by reacting the alkali metal with an alkyl halide or aryl halide or a dialkyl metallo compound or diaryl metallo compound where the metal contained therein is selected from the group consisting of cadmium, mercury, or zinc. The deposition of the sodium alkyl or sodium aryl on the support is done by conventional methods.

The method of the instant invention is carried out by introducing gaseous propylene into a reactor having a bed of solid dimerization catalyst, means for removing heat from the bed and a liquid product collection zone separate from the bed, preferably immediately therebeneath. The reactor is maintained at a temperature greater than 100° C. but below the critical temperature of 4-methylpentene-1, which has been reported as being about 212° C. (Advances in Chemistry Series, Physical Properties of Chemical Compounds, vol. II, page 236 (1959).) Preferably the reactor temperature is maintained in the range of 120°–210° C. and most preferably in the range of 150°–200° C. Since considerable heat is released due both to the exothermic nature of the dimerization reaction and the heat of condensation of the hydrocarbon material, suitable heat transfer means should be provided within the catalyst bed to maintain the temperature at the specified level.

The pressure in the reactor, which pressure is maintained by feeding gaseous propylene thereto at about the rate at which it is consumed in the dimerization reaction, is such that the propylene reactant will be maintained in the vapor phase at the temperature employed but the 4-methylpentene-1 will be condensed to liquid phase. The pressure thus should be higher than the vapor pressure of 4-methylpentene-1 at the operating temperature selected. For example, at a temperature of 120° C. a pressure of 70 p.s.i.g. or higher will be satisfactory, while at a temperature of 175° C., a pressure of 225 p.s.i.g. or higher should be used. As the propylene passes into the bed of dimerization catalyst, 4-methylpentene-1 is produced in the form of a liquid film on the catalyst surface and flows immediately to the liquid collection zone. The operation thus permits only a short time of contact between the 4-methylpentene-1 and the catalyst so that little if any isomerization to undesirable isomers is obtained. The 4-methylpentene-1 can be withdrawn continuously or periodically from the liquid collection zone and passed from the reactor.

The bed of propylene dimerization catalyst is of such depth and the interstices therein are sufficiently large that the time the 4-methylpentene-1 is in contact with the catalyst is minimal. By such design the amount of isomerization of the 4-methylpentene-1 to the other isomers of methylpentene is substantially eliminated or greatly reduced.

This invention is further described in a specific embodiment with reference to the accompanying diagram which shows a vertical reactor in section illustrating in simplified manner how the invention is practiced. It should be understood that the reactor as shown is merely illustrative and is not intended to represent a design that would be used commercially. Numerous reactor designs for practicing the invention are permissible and the invention does not depend upon any particular design. One suitable type of reactor that can be used is described in Banks United States Patent No. 2,244,599.

With reference to the drawing, propylene in vapor form at sufficient pressure is fed through a back-pressure regulating valve 10 into a reactor 11 containing a bed 12 of dimerization catalyst such as potassium supported on granular potassium carbonate. The reactor is provided with means for removing heat, indicated by cooling coil 15, positioned within catalyst bed 12, so that the heat released in the dimerization reaction and the heat of condensation resulting from conversion of the hydrocarbon from vapor to liquid state can be removed. This is necessary in order to maintain the temperature within the reactor below the critical temperature of the dimerization product. The propylene fed to the reactor preferably is preheated (by means not shown) so that its temperature at the locus where it enters bed 12 is maintained at about 175° C. A pressure of about 250 p.s.i.g. is continuously maintained in the reactor by the introduction of gaseous propylene through valve 10. As the 4-methylpentene-1 is formed in the liquid phase it trickles through the bed of dimerization catalyst and rapidly drains to the bottom of the reactor where it collects as a liquid pool 13. The 4-methylpentene-1 is removed through line 14 at the bottom of the reactor either intermittently or continuously. Due to the short time of contact between the dimerization product and the catalyst within bed 12, little isomerization can occur and the product is composed mainly of 4-methylpentene-1.

It can be seen that the present manner of carrying out the dimerization of propylene permits the propylene to be in contact with the catalyst as long as is required to effect dimerization. On the other hand it does not allow undue contact between the catalyst and the primary dimerization product (4-methylpentene-1) that would cause substantial formation of undesirable isomers. Feeding of the propylene through pressure regulating valve 10 occurs automatically at about the rate at which the propylene is consumed and the pressure in reactor 11 is thereby maintained at a level at which the 4-methylpentene-1 will be a liquid at reactor temperature. The height of the bed 12 and the size of the void spaces therein are such that the 4-methylpentene-1 as it forms drains rapidly from the bed. The time that this product remains in pool 13 at the bottom of the reactor is not important since it is then no longer in contact with the catalyst and will not undergo isomerization.

In practicing the present process in cases where the propylene feed contains substantial amounts of inert impurities such as ethane, propane, or butane, means (not shown) can be provided for removing a drag stream from the vapor space of the reactor to prevent the impurities from the building up in the system. However, this generally will not be necessary unless the amount of such impurities is high, for the reason that the impurities will dissolve under the pressure prevailing in the reactor to some extent in the liquid phase formed. Hence they will be continuously removed in solution in the liquid product withdrawn from the bottom of the reactor. Some unreacted propylene may also be removed in this manner but the amount generally will be insignificant so that provision need not be made for recovering and recycling it.

We claim:
1. Method of preparing 4-methylpentene-1 by the dimerization of propylene which comprises
   (a) feeding gaseous propylene to a reactor having a bed of solid dimerization catalyst, means for removing heat from said bed and a liquid product collection zone separate from the bed, said catalyst comprising a support containing a dimerization component selected from the group consisting of alkali metals, alkali metal alkyls and alkali metal aryls,
   (b) maintaining said reactor at a temperature above 100° C. but below the critical temperature of 4-methylpentene-1,
   (c) maintaining the pressure in said reactor, by the introduction of gaseous propylene thereto, sufficiently high to cause liquefaction of 4-methylpentene-1 within the bed while maintaining the temperature therein below said critical temperature, whereby 4-methylpentene-1 condenses within said bed as dimerization of propylene occurs and immediately flows to said collection zone, and
   (d) withdrawing liquid 4-methylpentene-1 from said reactor.

2. Method according to claim 1 wherein the catalyst is potassium carried on a support.

3. Method according to claim 2 wherein the support is an alkali metal salt.

4. Method according to claim 1 wherein the catalyst is selected from the group consisting of an alkali metal alkyl and an alkali metal aryl contained on a support in which the alkali metal is selected from the group consisting of sodium, potassium, rubidium, and cesium.

5. Method according to claim 4 wherein the alkali metal is sodium.

6. Method according to claim 4 wherein the alkali metal is potassium.

7. Method according to claim 4 wherein the support is an alkali metal salt.

8. Method according to claim 5 wherein the support is an alkali metal salt.

9. Method according to claim 6 wherein the support is an alkali metal salt.

References Cited by the Examiner

UNITED STATES PATENTS

| | | | |
|---|---|---|---|
| 3,104,271 | 9/1963 | Lindsay | 260—683.15 |
| 3,175,020 | 3/1965 | Wilkes | 260—683.15 |
| 3,244,768 | 4/1966 | Holt | 260—683.15 |

DELBERT E. GANTZ, *Primary Examiner.*

R. H. SHUBERT, *Assistant Examiner.*